United States Patent [19]
Bagnulo

[11] 3,916,502
[45] Nov. 4, 1975

[54] METHOD OF ESTABLISHING A PIPE JOINT
[76] Inventor: Luigi Bagnulo, Via A. Volta, 18, Milan, Italy
[22] Filed: Jan. 10, 1974
[21] Appl. No.: 432,342

Related U.S. Application Data
[62] Division of Ser. No. 289,913, Sept. 18, 1972, abandoned.

[30] Foreign Application Priority Data
Sept. 17, 1971 Italy .................................. 28751

[52] U.S. Cl. .................... 29/451; 29/455; 29/460; 285/294; 285/374
[51] Int. Cl.² ........................................ B23P 11/02
[58] Field of Search ...... 29/460, 451, 455; 285/294, 285/374, 297

[56] References Cited
UNITED STATES PATENTS

| | | | |
|---|---|---|---|
| 2,759,254 | 8/1956 | Soehnlen et al. | 29/460 X |
| 3,331,621 | 7/1967 | Bagnulo | 285/374 X |
| 3,606,401 | 9/1971 | Schwarz | 285/294 |

FOREIGN PATENTS OR APPLICATIONS

| | | | |
|---|---|---|---|
| 1,219,145 | 5/1960 | France | 285/374 |
| 521,458 | 3/1955 | Italy | 285/294 |

Primary Examiner—Charlie T. Moon
Attorney, Agent, or Firm—Michael S. Striker

[57] ABSTRACT

A first pipe has a barrel-shaped female end portion and a second pipe has a similarly shaped male end portion received in the female end portion so that they define between themselves a substantially barrel-shaped clearance. Received in stressed condition at one end of the clearance is an annular sealing gasket and received in similarly stressed and compressed condition at the other end of the clearance, adjacent the open end, is an annular locking ring of hard rubber or the like, a portion of which is received in an annular groove provided in the inner circumferential surface of the female end portion or in the outer circumferential surface of the male end portion. The space between the sealing gasket and the locking ring is filled with a hardened flowable material which has been introduced through a hole provided in the female end portion and communicating with the clearance.

7 Claims, 4 Drawing Figures

METHOD OF ESTABLISHING A PIPE JOINT

This is a division, of application Ser. No. 289,913 filed Sept. 18, 1972 now abandoned.

The present invention relates to a pipe joint, and more particularly to a monolithic pipe joint.

It is already known to provide pipe joints for connecting two pipes or pipe sections in which a female end portion on one pipe accommodates a male end portion on the other pipe so that they define with one another a clearance which is filled with an originally flowable and subsequently hardened material. The purpose is to provide a rigid pipe joint which is not only fluid tight to prevent the escape of liquids or gases carried in such a pipe, but also in which the compression of a sealing gasket inserted into this clearance is maintained substantially unchanged, with stress-transmission between the two pipes taking place via the hardened material so that it becomes difficult if not impossible for the pipe joint to develop a leak if stresses act on the pipes tending to displace them relative to one another.

To provide such known joints with still greater resistance to mechanical stresses, particularly stresses acting in axial direction of the connected pipes, which tend to loosen the joint, it is known to provide the pipe end portions with surfaces which, when they define the clearance accommodating the hardened material, extend essentially in parallelism with one another and with the clearance having a barrel-shaped or double-conical contour, converging at both of its ends towards the common axis of the two connected pipes. With this latter type of arrangement, the hardenable material is poured in flowable state in absolute tight stress-transmitting engagement with the inner and outer surfaces bounding the clearance, and in fact such engagement will increase in the event of stresses acting upon the pipes and tending to separate them and thereby separate the pipe joint, because the material filling the clearance will be placed under compression in the event of such stresses due to the configuration of the clearance.

However, the prior art, and in particular the last-mentioned type of joint, has certain disadvantages. One of these is the fact that it is difficult to introduce the hardenable material into the clearance. Heretofore the hardenable material has been introduced through the open end of the female pipe end portion which accommodates the male pipe end portion. This requires that the entire cross section of the clearance at the open end must be sealed except for a small inlet through which the material can be introduced. Evidently, this is disadvantageous and time consuming. More important, however, is a second disadvantage which is that, when the joint is being produced, the two pipes must be pressed against one another with an auxiliary device that is relatively complicated and costly because only when they are so compressed against one another will the gasket located in the clearance be subjected to the desired high degree of pre-compression which is necessary to assure a proper seal in the finished joint. Moreover, the device which effects such pressing-together of the pipes, and consequent compressing of the sealing gasket, cannot be removed until the hardenable material has in fact completely hardened at which time removal of the device will then no longer result in releasing of the pre-compression of the sealing gasket.

Quite clearly, when several such pipe joints are to be produced, for instance on a long pipe having numerous joints, this latter problem will cause disadvantages. It is either necessary to form the joints one by one, utilizing a single device and leaving that device in place until one joint is completed before the device can be removed and the next joint can be produced, or else a large number of such devices must be available at all times so that they can be used simultaneously, each for the production of a different pipe joint. Evidently, the first alternative is very time-consuming because it is necessary to wait until each pipe joint in turn is completed, that is until the flowable material introduced into the clearance of the pipe joint is hardened. The second alternative is equally unattractive because it requires a large investment in many of the devices, an investment which not only ties up capital but may not in the long run be worthwhile as it is possible that a requirement for that many devices at one and the same time will exist only once or only ocassionally. It is, accordingly, a general object of the present invention to overcome the disadvantages of the prior art.

More particularly, it is an object of the present invention to provide an improved pipe joint of the type under discussion, which does not possess these disadvantages.

An additional object of the present invention is to provide such an improved pipe joint which can be assembled requiring the use of the auxiliary device only for a brief period of time, namely to provide for pre-compression of the sealing gasket, with all subsequent assembly operations being capable of being carried out without the use of the auxiliary device.

In pursuance of these objects, and of others which will become apparent hereafter, one feature of the invention resides in a pipe joint which, briefly stated, comprises a first pipe having a female end portion provided with an open end and bounded by an outwardly concave inner surface defining an inner diameter greater than that of the first pipe. The second pipe has a male end received through the open end in the female end portion and bounded by an outwardly convex outer surface defining an outer diameter smaller than the inner diameter but greater than that of the remainder of the first pipe, with the surfaces defining with one another an annular clearance. An annular sealing gasket is sealingly lodged in compressed condition at the axial end of the clearance which is remote from the open end, and an annular sealing ring is sealingly lodged in compressed condition in the clearance at the other axial end in the region of the open end, with retaining means retaining the locking ring against displacement axially of the clearance. A body of hardened flowable material fills the clearance intermediate the gasket and the locking ring in stress-transmitting engagement with the surfaces and an inlet is provided in the female end portion in communication with the clearance for the admission of the flowable material into the latter.

Advantageously, the retaining means will be in form of a groove provided in one or both of the surfaces bounding the clearance, and the annular locking ring is in tight frictional engagement with both of these surfaces and has a radially projecting annular portion which is lodged in the groove. The annular locking ring should be of a compressible material which has a permanent tendency to elastically expand and return to its uncompressed state, for example natural or synthetic hard rubber. In addition, the locking ring must have a substantial coefficient of friction, so selected as to avoid slipping when in contact with the surfaces bounding the clearance.

Depending upon the dimensions of the pipe joint, the locking ring may be of one piece or may be composed of two or more part-circular sections which are fitted together at the time the ring is installed, which of course takes place while the auxiliary device (known from the prior art) keeps the gasket of the joint in pre-compressed condition.

If it is desired for the joint to be electrically insulating, so that electrical continuity between the constituent pipes of the joint is interrupted, for instance to avoid corrosion due to stray electric currents, it is merely necessary for the locking ring, the hardened material and the sealing gasket to be of electrically insulating material. If and when necessary, metallic surfaces of the pipes can also be covered with a coat of electrically insulating material, such as paint or the like.

The pipes may be generally of metallic material, particularly of steel or of cast iron. The sealing gasket itself may also serve as a locking sleeve, either to reinforce the function carried out by the annular locking ring or in some instances even capable of replacing the same. In this case appropriate means must be provided in cooperation with the sealing gasket as will be discussed later.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

Figure 1:
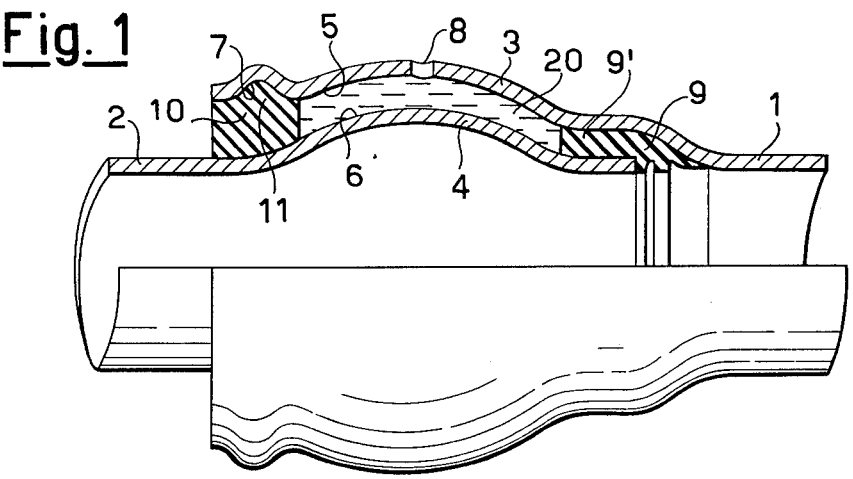
FIG. 1 is a side view of a pipe joint according to one embodiment of the invention, in partly sectioned illustration.

Discussing the drawing now in detail, and firstly the embodiment illustrated in FIG. 1 thereof, it will be seen that this pipe joint connects two pipes 1 and 2. The pipe 1 is provided with a female end portion 3 and the pipe 2 is provided with a male end portion 4. The female end portion 3 has an open end at the left-hand side of FIG. 1, and the male end portion 4 of the pipe 2 is received through this open end in the female end portion 3. The inner circumferential surface bounding the female end portion 3 is identified with reference numeral 5 and is outwardly concave, with the inner diameter bounded by the inner surface 5 being greater than the inner diameter of the remainder of the pipe 1. The male end portion 4 is bounded by an outwardly convex outer surface 6, the outer diameter of which is smaller than the inner diameter of the female end portion 3 which is bounded by the inner surface 5, but greater than the inner diameter of the remainder of the pipe. The surfaces 5 and 6 thus define with one another an annular clearance which, as the drawing shows in the embodiment of FIG. 1, is generally barrel-shaped and tapers in direction towards the opposite axial ends of the clearance. In fact, the overall appearance of the end portions 3 and 4 is also substantially barrel-shaped and of course the pipes 1 and 2 will be in axial alignment.

In accordance with the present invention, one of the surfaces 5 and 6, in FIG. 1 the inner surface 5 of the female end portion 3, is provided in the region of the open end of the latter with an inner circumferential groove 7. Further, the wall of the female end portion 3 is provided with an inlet hole 8 through which the hardenable material 20 can be poured into the clearance between the surfaces 5 and 6 when the material is still in flowable state.

Located at the axial end of the clearance which is remote from the open end of the female end portion 3 is an annular sealing gasket 9 of suitable sealing material, which is in pre-compressed state being inserted and lodged in sealing condition as illustrated. The pre-compression is effected through the use of the auxiliary compression-producing device mentioned earlier and which is not illustrated, it being understood that such a device will push the pipes 1 and 2 in mutually opposite directions whereby by gasket 9 will undergo compression. During this pre-compression of the gasket 9, a locking ring 10 of annular configuration is inserted by shrinkage between the surfaces 5 and 6. The ring 10 is advantageously of natural or synthetic hard rubber which has a tendency to expand to its uncompressed condition and has a substantial coefficient of friction. The "shrinkage" of the locking ring 10 normally requires merely advancing the ring 10 axially of the pipe 2 into the open end of the female end portion 3 and exerting sufficient pressure upon it so that it will enter into the open end portion 3. Pressure upon the ring 10 can be released when its radially extending annular portion or protuberance 11 can enter into the groove 7, whereby the ring 10 locks the end portions 3 and 4 together due to the fact that the achieved pre-compression of the gasket 9 now will continue even if the auxiliary device is removed, it being evident that the pipes 1 and 2 will not move axially away from one another upon such removal due to the frictional engagement and retentive capability of the locking ring 10. The device can now be removed and used for the assembly of another pipe joint, and the material 20, a synthetic polymerizable resin, is introduced through the inlet hole 8 into the clearance between the surfaces 5 and 6 and is allowed to harden. The portion 9' of the gasket 9 serves to seal the annular clearance as illustrated.

Figure 2:
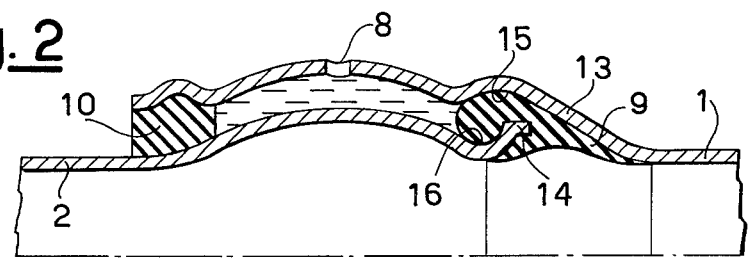
FIG. 2 is a fragmentary sectioned view illustrating another pipe joint according to the invention.

In FIG. 2 I have shown an embodiment which is reminiscent of that of FIG. 1 and in which like reference numerals identify like elements. However, in FIG. 2 the gasket 9 has a dual function, namely to seal the clearance as in the case of FIG. 1, and in addition to act as an auxiliary locking ring or sleeve. In FIG. 2 the female end portion of the pipe 1 is identified with reference numeral 13 and the male end portion of the pipe 2 is identified with reference numeral 14. The surface portions 15 and 16 of the female end portions 13 and 14, respectively, are so configured that they form with one another a hollow which extends circumferentially of the pipe joint and into which a portion of the gasket 9 can penetrate when axial stress is exerted upon pipes 1 and 2 in mutually opposite axial directions by the non-illustrated device. When the portion of the gasket 9 penetrates into this annular clearance or space defined between the surfaces 15 and 16, it will act as an auxiliary locking ring aiding the locking action of the ring 10.

Figure 3:
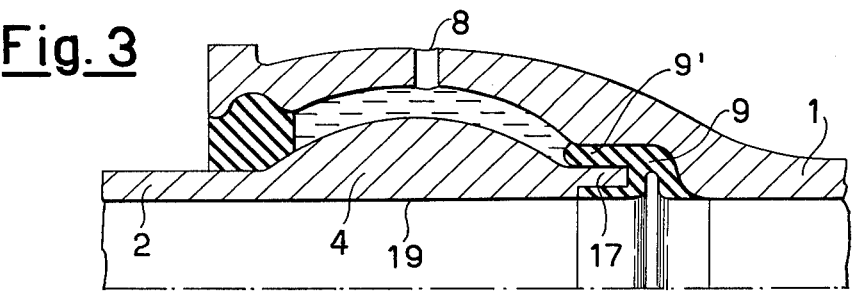
FIG. 3 is a view similar to FIG. 2 illustrating an additional embodiment of the invention.
Figure 4:
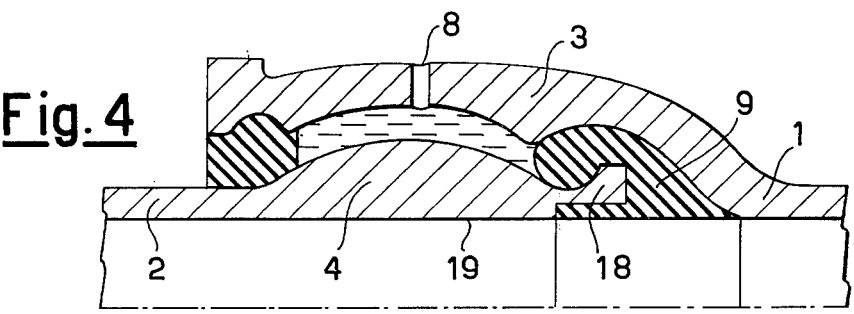
FIG. 4 is a view similar to FIG. 3 illustrating a further embodiment of the invention.

The embodiments in FIGS. 3 and 4 are particularly suitable for use with cast iron pipes. In FIG. 3, which is reminiscent of the embodiment in FIG. 1, reference numerals identical to those of FIG. 1 have been employed to identify like components. However, in the embodiment of FIG. 3 the inner end portion of the male end portion 4 of the pipe 2 is configurated somewhat differently from FIG. 1, being identified with reference numeral 17 and shaped to provide the space shown in FIG. 3 and in which the gasket 9, 9' will assume the substantially U-shaped configuration illustrated. The inner circumferential surface of the pipe 2 is here identified with reference numeral 19 and is cylindrical, unlike FIG. 1 where it is outwardly convex in keeping with the outwardly concave configuration of the outer surface 6 of the male end portion 4.

In FIG. 4 like elements are identified with like reference numerals, but here there is a difference with respect to FIG. 3 in the configuration of the end portion 18 on the pipe 2, which end portion 18 corresponds to the end portion 17 of FIG. 3 but has the same purpose as the surface 16 of FIG. 2. In other words, in FIG. 4 there is again provided an annular circumferentially extending recess into which a portion of the gasket 9 can enter to serve as an auxiliary locking ring.

It will be appreciated that the inner and outer surfaces of the pipe joints and their associated pipes can be painted or otherwise coated as desired.

It will be understood that each of the elements described above, or two or more together, may also find a useful application in other types of constructions differing from the types described above.

While the invention has been illustrated and described as embodied in a pipe joint, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. A method of establishing a rigid pipe joint, comprising the steps of providing the respective ends of the pipes to be joined with interfitting male and female end portions having respective longitudinal axes; providing an inlet opening in said female end portion; mounting an annular sealing gasket on one of said end portions; introducing said male end portion coaxially and with clearance into said female end portion; subjecting said end portions to opposite axial forces urging said sealing gasket into contact with both end portions so that it prevents further axial displacement thereof beyond their respective relative positions and separates said clearance from the interior of said male end portion; introducing an annular locking ring into said clearance to lockingly engage said end portions in their respective relative positions and to seal said clearance with respect to the exterior of said male end portion; discontinuing said axial forces whereupon said locking ring prevents said end portions from axially displacing out of said respective relative positions, whereby a sealed semi-rigid pipe joint is obtained; and introducing a hardenable flowable material into said sealed clearance between said sealing gasket and said locking ring through said inlet opening in said female end portion, whereby a sealed rigid pipe joint is obtained upon solidification and hardening of said hardenable material.

2. A method as defined in claim 1, wherein said step of introducing a hardenable flowable material includes completely filling said clearance with said material.

3. A method as defined in claim 1, wherein said step of introducing a hardenable flowable material includes completely filling said clearance with a synthetic resinous substance.

4. A method as defined in claim 1, wherein said step of providing said ends with male and female end portions includes shaping said female end portion with at least an internal substantially barrel-shaped surface and shaping said male end portion with at least an external substantially barrel-shaped surface, said internal and external surfaces defining said clearance.

5. A method as defined in claim 1, wherein said step of providing said female end portion includes forming the latter with an internal surface provided with at least one annular depression for accommodating a portion of one of said sealing gasket and said locking ring.

6. A method as defined in claim 1, wherein said step of providing said male end portion includes forming the latter with a free end projection; and wherein said step of mounting said sealing gasket includes attaching of said sealing gasket to said free end projection.

7. A method as defined in claim 1, wherein said subjecting step comprises compressing said sealing gasket prior to said step of introducing said locking ring; and wherein said step of introducing said locking ring includes lockingly engaging said end portions with a force sufficient to maintain said compression subsequent to said discontinuing step.

\* \* \* \* \*